Patented June 16, 1925.

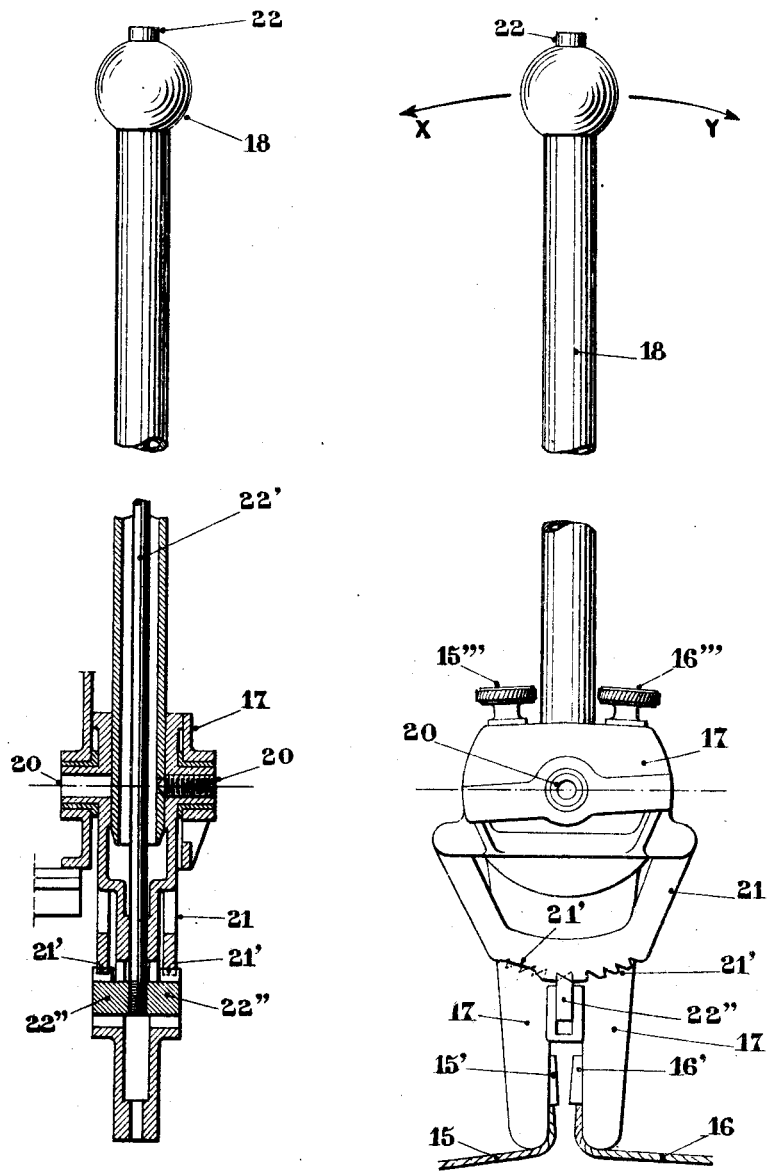

1,542,290

UNITED STATES PATENT OFFICE.

GUSTAVE DUMONT, OF NEUILLY-SUR-SEINE, FRANCE.

DEVICE FOR OPERATING THE BRAKES OF ALL THE FOUR WHEELS OF A VEHICLE.

Application filed March 23, 1923. Serial No. 627,177.

*To all whom it may concern:*

Be it known that I, GUSTAVE DUMONT, a citizen of the French Republic, residing at Neuilly-sur-Seine, Seine, France, have invented certain new and useful Improvements Relating to Devices for Operating the Brakes of All the Four Wheels of a Vehicle, of which the following is a specification.

The present invention relates to a system for operating the brakes of the four wheels of an automobile vehicle. The device has been arranged for the purpose of obtaining a simple construction and an efficient certain and uniform operation of the brakes of the four wheels.

Moreover this system permits of obtaining at will by means of the operation of a hand lever the braking either of the front wheels or of the rear wheels.

The invention will now be described with reference to the accompanying drawings wherein:—

Figure 4 is a corresponding external view, and

Figure 5 is a vertical section on the line 5—5 of Figure 3.

Figure 1:
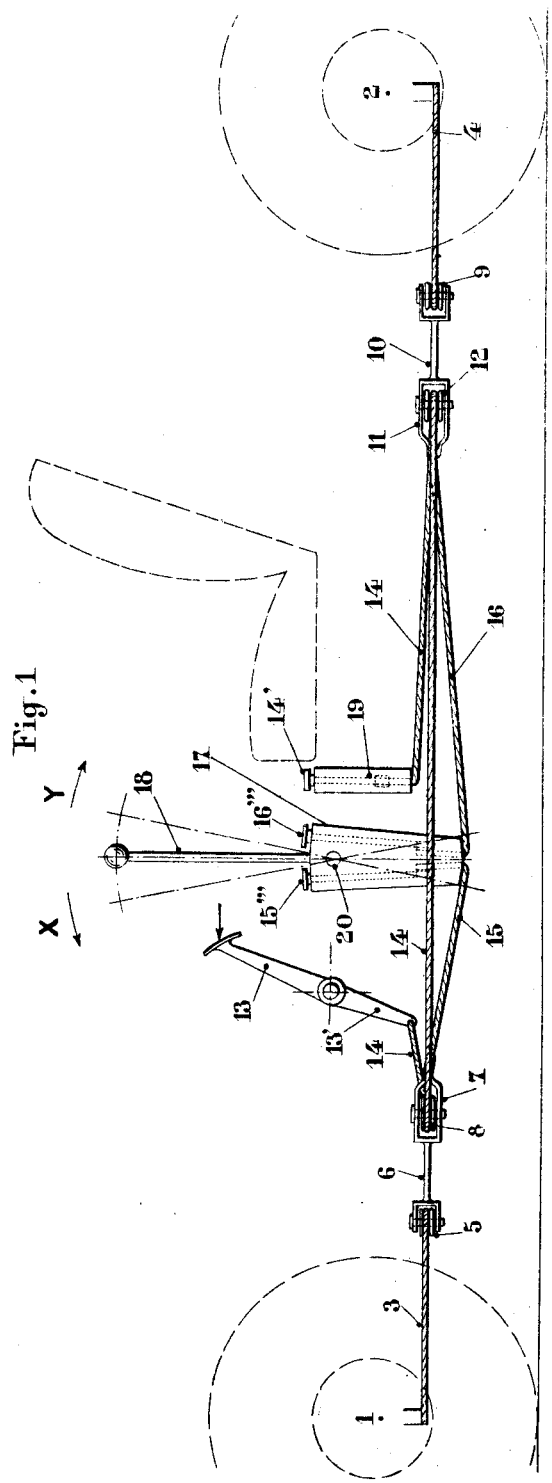
Figures 1 and 2 illustrate diagrammatically in elevation and plan the system of cables and the two operating mechanisms by a pedal and by a hand lever.
Figure 2:
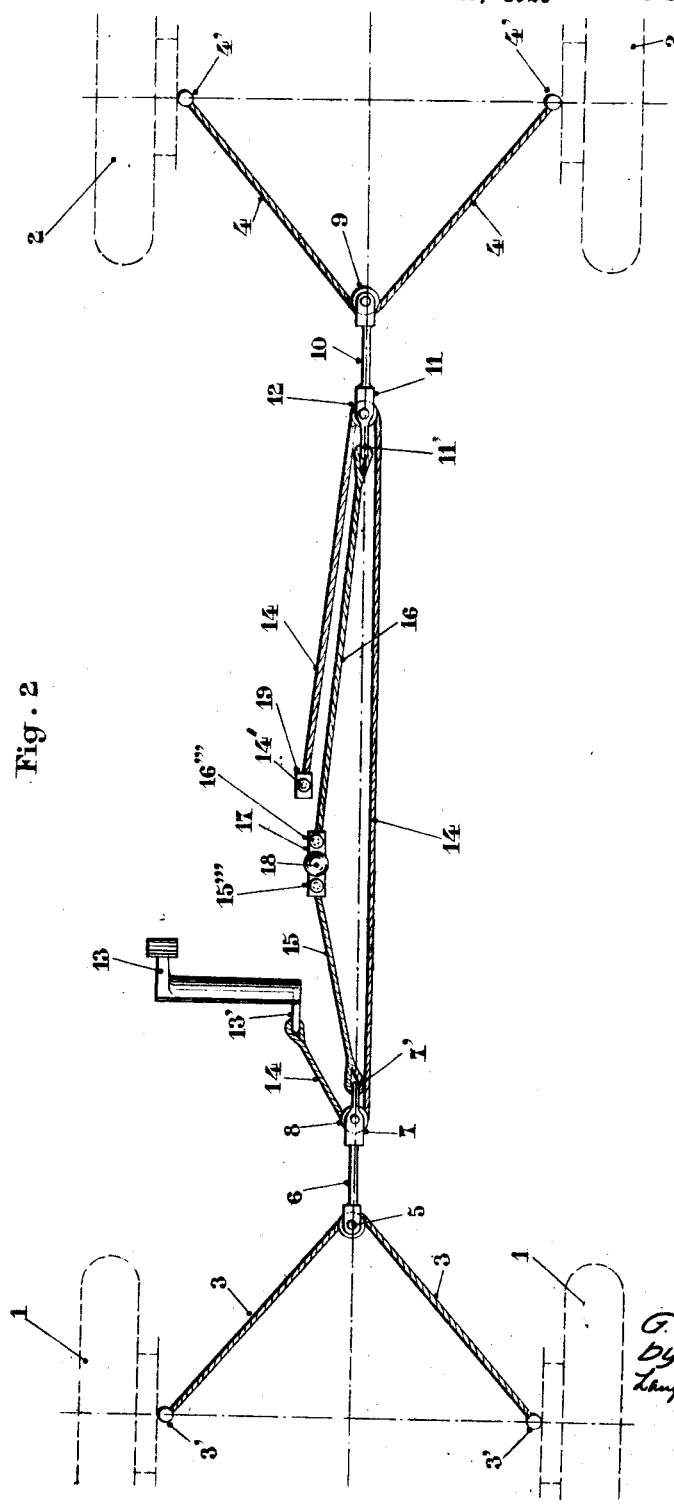

In the diagrammatic Figures 1 and 2, 1 indicates the front wheels and 2 the rear wheels.

The mechanical construction of the brakes such as drums, segments, blocks or bands, cams and levers, which may be of any suitable construction have not been shown in the drawings as it is only desired to describe the movement of the movable member or members for operating the brake of each wheel, which is determined by the operation of a cable which is suitably directed and guided.

It is the general arrangement and method of operation of these cables by a hand lever and by a pedal under particularly efficient conditions and uniform action on the four wheels, of its power, of the regularity and certainty, which forms the subject of the present invention.

The brakes of the two front wheels 1 are actuated by a cable 3 and the brakes of the rear wheels 2 are actuated by a cable 4.

The cable 3, of which the two ends are connected in any suitable manner at 3' 3' to the operating members of the brakes of the front wheels 1, pass around a pulley 5 mounted in a frame integral with a rod 6 which is suitably supported and guided on the chassis of the vehicle by means which it is not necessary to illustrate.

The cable 4 which at 4' 4' actuates the brakes of the rear wheels 2 passes around the pulley 9 mounted in a frame integral with a rod 10 arranged in the same manner as the rod 6 above described.

At its other end the rod 6 is provided with a frame 7 for a pulley 8 whilst the rod 10 is provided with a frame 11 for a pulley 12.

A cable 14 which is attached at one end to a fixed point 19 of the chassis, preferably near the driver's seat passes around the pulley 12 then around the pulley 8 and is attached at its other end to the arm 13' of the operating pedal 13.

The attachment of this cable 14 to the fixed point 19 may be effected by means of a screwed rod 14' which can be adjusted in position by the driver so as to enable the tension of the cable always to be maintained at a suitable degree.

The arrangement may be effected in a manner similar to the method of attachment of the cables 15 and 16 to the oscillating portion 17 as hereinafter described.

To the frame 7 and to the frame 11 are attached at 7' and 11' two cables 15 and 16 which, at their other ends are connected, preferably in an adjustable manner, to a member 17 oscillating on a pivot 20, this member 17 being fixed to the hand lever 18 in a manner to be hereinafter described.

According to this system the pedal, which exerts a pull upon the cable 14, when operated produces a braking action which will be equally distributed by the cable 14 between the rods 7 and 10 and consequently between the cables 3 and 4 which respectively operate the brakes of the front wheels 1 and those of the rear wheels 2. The braking effort is thus equally distributed and in equilibrium between the four wheels.

As regards the hand lever 18 this when moved forwards in the direction of the arrow X operates the cable 15 and when moved in the direction of the arrow Y it operates the cable 16 so that through the medium of the rods 6 or 10 and the cables 3 or 4 either the brakes of the front wheels 1 or those of the rear wheels 2 are operated.

This arrangement is very important as it enables, when the vehicle is stopped and it is desired to change a tire or one of the front or rear wheels, of insuring the braking of the vehicle and of retaining it in a stationary position by the application of the brakes to that pair of wheels which is not to be repaired or attended to.

Moreover in the case of the breaking of one of the cables, either the cable 3, the cable 4, or the cable 14, rendering the operation of the pedal brake 13 13' inoperative, the lever 18 remains available for action upon the one or the other pair of wheel at the front or back, so that a sufficient braking force is available for the working of the vehicle.

Figure 3:
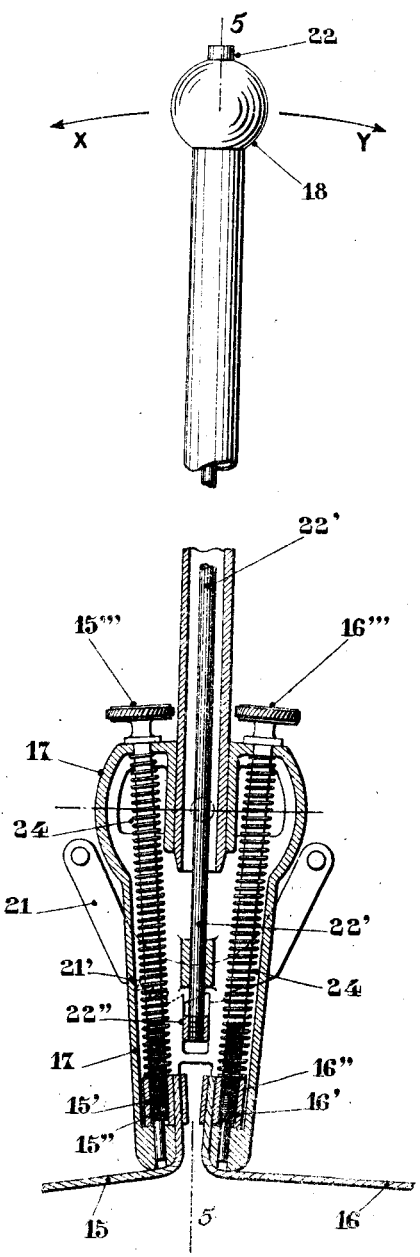
Figure 3 is a view to a larger scale in detail, partly in section, of the device operated by the hand lever.

Figures 3, 4 and 5 show in detail the construction of the oscillating member 17 which is secured to the hand lever 18.

This member consists of a flat box 17, generally of oblong shape supported by two trunnions 20 (Figure 5) on the chassis of the vehicle.

Into the lower part of this box pass the two cables 15 and 16 of which the ends are attached to two movable members 15' and 16' adjusted and guided on extensions of the box. These members 15' and 16' form nuts which are engaged by the threaded rods 15'' and 16'' which are supported and are free to turn in the upper and lower end walls of the box 17.

At their upper ends and outside the box 17 the rods 15'' and 16'' are provided with heads 15''' and 16''' by means of which they can be turned so as to raise and lower the nuts 15' and 16' and thus adjust the tension of the cables 15 and 16. Springs 24 arranged around the rods 15'' and 16'' bear at one end upon the wall of the box 17 and at the other end upon the nuts 15' and 16'. These springs are for the purpose of holding down the various parts and to prevent vibration.

To the box 17 is secured the hand operating lever 18. This lever is provided with a button 22 integral with a rod 22' for holding the rod in position. The rod is provided at its lower end with a double pawl 22'' adapted to engage with the two tooth members 21' of a double sector 21 secured to the chassis to the vehicle. Rod 22' controlling pawls 22'' is constructed for releasing the pawls in any desired manner.

The two tooth members 21' and their two pawls 22'' are oppositely directed in such a manner as to enable the lever 18 with its box 17 to be locked in position according as to whether it is moved forwardly in the direction of the arrow X for operating the front brakes or as to whether it is moved rearwards in the direction of the arrow Y to operate the rear brakes.

Only the essential features of the invention have been described. It will of course be understood that various modifications may be made in accordance with the general arrangement hereinbefore described.

The operation of the cables has only been described in a diagrammatic manner, it will of course be understood that these cables are suitably disposed in the chassis of the vehicle and that they receive the necessary movements for the necessary change of direction and that as regards for example the brakes of the front wheels 1, the cable 3 which operates them is guided by means of guide pulleys suitably disposed in such a manner that the steering movements of these wheels, determined by the direction of movement, has no effect upon the tension of the cable 3.

Although in the above description the device for simultaneously operating the four brakes by the cable 14 is stated to be effected by a pedal 13 it will be understood that the invention is not limited to the operation of this cable 14 by means of a pedal and that it may be effected by means of a hand lever according to the type of vehicle and the prevailing conditions.

It may also be mentioned that the mechanism for operating the cables and consisting of a pedal or a hand lever may be caused to act upon the brakes through the medium of mechanical means of the servo-motor type and applying braking force either by means of the live energy of the vehicle or of a suitable motor.

What I claim is:—

1. A system for controlling the brakes of the four wheels of a vehicle, and particularly applicable to automobile vehicles, comprising, two front and two rear brake operating means, two cables, one connecting the front brake operating means and the other the rear brake operating means, two movable members, a pulley on each member, each pulley having one of the cables passing around it, a second pulley on each of the movable members, an operating member, and a third cable, connected at one end to an adjustable support, passed around each of the second pulleys and connected at the other end to the operating member.

2. A system according to claim 1, an operating cable attached to each of said movable members, an oscillating member, an operating lever on the oscillating member, each operating cable being connected to the oscillating member, two toothed sectors cooperating with the oscillating member, and two oppositely arranged pawls carried by the oscillating member and cooperating with the toothed sectors, whereby to lock the oscillating member in forward and rearward position.

3. A brake control system for four wheeled vehicles, comprising two front and two rear brake controlling members, an operating means connected to the four controlling members and actuating all four members upon movement of the same, a second operating member so connected to the two front and the two rear controlling members so that movement of the second operating member separately actuates either the two front or the two rear controlling members.

In testimony whereof I have signed my name to this specification.

GUSTAVE DUMONT.